United States Patent [19]

Goldowsky

[11] Patent Number: 5,713,670
[45] Date of Patent: Feb. 3, 1998

[54] SELF PRESSURIZING JOURNAL BEARING ASSEMBLY

[75] Inventor: Michael P. Goldowsky, Valhalla, N.Y.

[73] Assignee: International Business Machines Corporation, Armonk, N.Y.

[21] Appl. No.: 684,115

[22] Filed: Jul. 19, 1996

Related U.S. Application Data

[60] Provisional application No. 60/003,043, Aug. 30, 1995.

[51] Int. Cl.$^6$ ...................................................... F16C 32/06
[52] U.S. Cl. ........................... 384/115; 384/114; 384/292
[58] Field of Search ..................................... 384/100, 107, 384/113, 114, 115, 120, 286, 291, 292, 322, 378

[56] References Cited

U.S. PATENT DOCUMENTS

| | | | |
|---|---|---|---|
| 2,249,843 | 7/1941 | Marsland | 384/292 |
| 3,669,517 | 6/1972 | Hughes | 384/115 |
| 3,726,574 | 4/1973 | Tuffias et al. | 384/133 |
| 3,964,805 | 6/1976 | Schulien | 384/399 |
| 4,427,308 | 1/1984 | Sandberg | 384/115 |
| 4,883,367 | 11/1989 | Maruyama | 384/114 |
| 5,370,463 | 12/1994 | Asada et al. | 384/115 X |

*Primary Examiner*—Thomas R. Hannon
*Attorney, Agent, or Firm*—Stephen S. Strunck; Francis L. Conte

[57] ABSTRACT

A self pressurizing journal bearing assembly includes a tubular housing having a bore defining a plain cylindrical journal bearing, and a cylindrical rotary shaft disposed coaxially therein. The shaft includes a plain cylindrical journal spaced radially inwardly of the bearing to define a journal bearing gap. A screw pump is defined in part by a portion of the shaft, and is disposed inside the housing bore in flow communication with the journal bearing for continually circulating a lubricant thereto under pressure upon rotation of the shaft for accommodating lubricant end leakage from the journal bearing.

20 Claims, 4 Drawing Sheets

SELF PRESSURIZING JOURNAL BEARING ASSEMBLY

The present invention claims the priority date of provisional application Ser. No. 60/003,043, filed on 30 Aug. 1995, incorporated herein by reference.

BACKGROUND OF THE INVENTION

The present invention relates generally to journal bearings, and, more specifically, to the elimination of external pumps for pressurization of hydrodynamic journal bearings.

A typical journal bearing is defined by a plane cylindrical bearing which supports a portion of a smooth cylindrical shaft which defines the journal. A liquid lubricant such as oil separates the journal and the bearing to provide low friction losses and to prevent wear. Eccentric rotation of the journal in the bearing develops a hydrodynamic pressure in the oil film which supports the loads carried by the shaft and allows low friction rotation thereof. The journal bearing has two opposite axial ends from which the lubricant leaks during operation. A certain amount of lubricant must therefore be fed to the journal bearing continuously in operation to compensate for the end leakage and maintain load carrying capacity of the bearing.

Accordingly, a suitable external pump is typically provided for pressurizing the lubricant for flow to the journal bearing to provide the required lubricant flow thereto for accommodating bearing end leakage. The external pump increases the complexity and cost of the journal bearing arrangement, and requires additional mounting space therefor and associated fluid conduits. In typical industrial designs, the required external pump is of little concern.

However, in relatively small, portable consumer products for example, the use of a journal bearing and an associated external pump lubrication system would be undesirable. For example, portable disk drives are being developed for either playing musical compact discs, or providing computer memory. In these examples, an electrical motor rotates a suitable storage disk at high speed which requires suitable lubricated bearings for operation with preferably low energy losses. Since the device is portable, it may be dropped and therefore subjected to high transient shock loads on the order of several thousand g's.

Typical disc spindles or shafts use ball bearings to axially and radially support the shaft. However, typical ball bearings can sustain approximately 300 g's without experiencing damage. Shock loads, however, may be an order of magnitude greater than this capability which would therefore cause the ball bearings to develop substantially high Hertz contact forces leading to undesirable plastic deformation. The resulting damage to the ball and/or races adversely affects vibration, accuracy of spindle rotation, and life.

In another example, it is desirable to integrate a suitable disc drive into a conventional PCMCIA card or similar application for use with conventional personal computers. These cards have industry specifications and are quite thin. Mounting a disk drive therein therefore requires an extremely short bearing for supporting the rotating spindle within the thin envelope defined by the PCMCIA card.

Journal bearings possess a large transient load capacity and corresponding shock absorbing capability. However, no present journal bearing design is known which can meet the low power and space limitations of small disk drive devices such as those used in consumer products, and which are subject to substantial shock loads. It is therefore desirable to provide an improved journal bearing having substantial shock capability, with a suitable long term lubricant supply, reduced lubricant migration, low power consumption, and the ability to be reliably sealed with the absence of wear and lubricant leakage.

It is also desirable to provide suitable bearing stiffness axially, radially, and in tilt, with accurate concentricity, with a competitively low cost of manufacture. And, it is desirable to provide an improved journal bearing having capability for use in relatively thin devices where space limitations are critical in meeting or exceeding performance of conventional precision ball bearings.

SUMMARY OF THE INVENTION

A self pressurizing journal bearing assembly includes a tubular housing having a bore defining a plain cylindrical journal bearing, and a cylindrical rotary shaft disposed coaxially therein. The shaft includes a plain cylindrical journal spaced radially inwardly of the bearing to define a journal bearing gap. A screw pump is defined in part by a portion of the shaft, and is disposed inside the housing bore in flow communication with the journal bearing for continually circulating a lubricant thereto under pressure upon rotation of the shaft for accommodating lubricant end leakage from the journal bearing.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
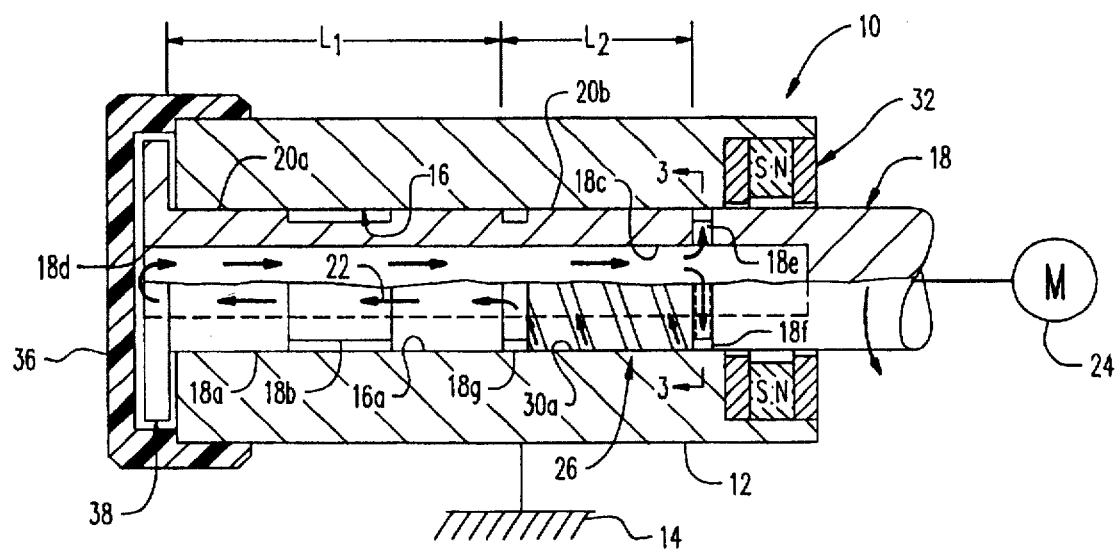
FIG. 1 is a schematic representation of an exemplary self pressurizing journal bearing assembly having a shaft mounted in a complementary journal bearing in accordance with one embodiment of the present invention.

Illustrated schematically in FIG. 1 is a self contained and self pressurizing journal bearing assembly 10 in accordance with an exemplary embodiment of the invention. The assembly includes a stationary tubular housing 12 which is suitably fixedly mounted to a stationary support or frame 14. The housing 12 includes a cylindrical bore 16 extending axially therethrough which preferably has a smooth radially inner cylindrical surface. In the exemplary embodiment illustrated in FIG. 1, the bore 16 at one end of the housing 12 defines a plain cylindrical journal surface or bearing 16a.

A cylindrical rotary shaft 18 extends through the bore 16 and is disposed in part coaxially in the journal bearing 16a. The proximal end of the shaft 18 has a smooth radially outer surface defining a plain cylindrical journal 18a spaced radially inwardly of the journal bearing 16a to define a journal bearing gap 20a having a suitable radial extent as illustrated in more particularity in FIG. 2. Returning to FIG. 1, the shaft journal 18a may have any suitable axial length for cooperating with a similarly sized journal bearing 16a for supporting the shaft 18 in rotary motion. In the exemplary embodiment illustrated, the shaft 18 may include an annular groove 18b which axially divides the journal 18a into two equal sections to reduce the requirement for a suitable liquid lubricant 22 circulated through the journal bearing gap 20a for providing a hydrodynamic squeeze film for supporting the shaft 18 under rotary motion.

As shown schematically in FIG. 1, a suitable motor 24 is operatively joined to the shaft 18 which rotates the shaft 18 in the bearing housing 12. In accordance with one feature of the present invention, an integral screw pump 26 is disposed radially inside the housing bore 16 and is defined in part by a portion of the rotary shaft 18. The screw pump 26 is also disposed in flow communication with the journal bearing 16a for continuously circulating thereto the lubricant 22 under suitable pressure upon rotation of the shaft 18. Rotation of the shaft 18 provides self pressurization of the journal bearing 16a by the self contained integral screw pump 26 for accommodating lubricant end leakage from the journal bearing 16a. In this way, the hydrodynamic squeeze film developed between the shaft journal 18a and its journal bearing 16a is maintained during rotation of the shaft 18 notwithstanding end leakage of the lubricant 22 which is inherent in plain journal bearings.

In the prior art, a separately powered, external lubricant pump is typically disposed in flow communication with a journal bearing for providing a lubricant to make up for journal bearing end leakage. The prior art arrangement, accordingly, is substantially more complex than the present invention and requires suitable fluid conduits and seals, and additional power consumption for operation which are all generally undesirable especially for relatively small journal bearings in the size of fractions of an inch.

The screw pump 26 may be incorporated with the shaft 18 in various embodiments in accordance with the present invention with and without integral thrust bearings, and with or without suitable shaft seals. In the exemplary embodiment illustrated in FIG. 1, the shaft 18 is supported at its proximal end in the housing 12 and may be operated in any orientation such as the horizontal orientation illustrated in FIG. 1, or a vertical orientation rotated a quarter turn clockwise to that illustrated in FIG. 1 for supporting a ceiling fan for example.

Other exemplary applications include portable computer disk drives which include a spindle or shaft operating at high rotary speed and which require precise mounting of the shaft for accurate operation of the memory disk in reading therefrom or writing thereto. A conventional portable disk drive typically utilizes pre-loaded ball bearings for precise axial and radial support. The bearings are greased and self contained for long term operation. They also provide low friction rotation of the shaft and therefore waste little power in operation which is a significant concern in portable, battery operated disk drives.

However, a portable disk drive is subject to being dropped which can produce transient impact shock loads of several thousand g's which is typically an order of magnitude greater than the shock load capability of conventional ball bearings. Since balls contact their cooperating races at small points, significant Hertz contact stresses are developed during high gravity shock loads which plastically deform the balls and/or races and prevents the bearing from meeting required specifications in positional accuracy, vibration, and life. And, at speeds above 10,000 rpm, grease cannot be readily contained.

The self contained and self pressurizing journal bearing 16a illustrated in FIG. 1 now provides an alternate arrangement to ball bearings in precision portable computer disk drives, for example, which can withstand the several thousand gravity load experienced upon dropping the disk drive. The journal bearing 16a and cooperating journal 18a provide relatively large complementary contact surfaces which spread any shock loads developed during dropping the device to significantly reduce Hertz contact forces without plastic deformation. The clearances around the shaft 18 through which the lubricant 22 is circulated may be made suitably small on the order of 1 ml for example, for providing precision support of the shaft 18 both in the radial and axial directions. And, the lubricant 22 may now be contained and effectively sealed within the assembly 10.

Figure 2:
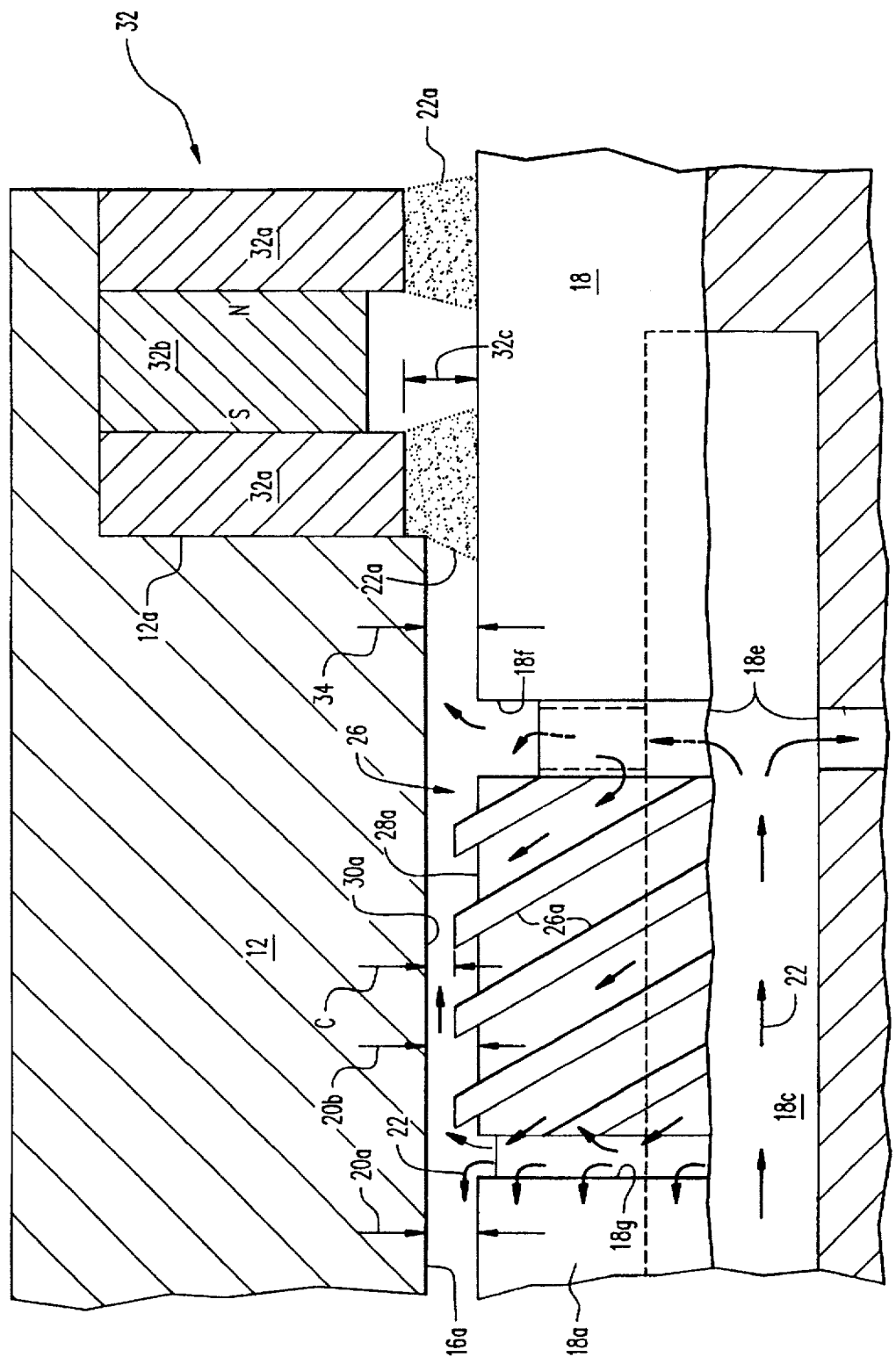
FIG. 2 is an enlarged partly sectional, axial view of a portion of the journal bearing assembly illustrated in FIG. 1 showing one embodiment of an integral screw pump disposed on the shaft between the journal bearing and a shaft seal.

Referring in more particularity to FIG. 2, the screw pump 26 is illustrated in an exemplary embodiment and includes a spindle 28a disposed coaxially with the shaft 18, and a tubular casing or seat 30a disposed concentrically around and axially coextensively with the spindle 28a, and is spaced radially outwardly therefrom to define a pump gap 20b. A plurality of helical screw threads 26a are integrally disposed on either the spindle 28a as illustrated, or on the seat 30a (not shown) in the pump gap 20b so that relative rotation between the pump spindle 28a and seat 30a upon rotation of the shaft 18 self-pumps the lubricant 22 under pressure axially and circumferentially along the screw threads 26a to feed the journal bearing gap 20a with the lubricant under pressure.

In order to provide recirculation of the lubricant 22 in the exemplary embodiment illustrated in FIGS. 1 and 2, the shaft 18 further includes one or more axial bores 18c for channeling the lubricant 22 therethrough, with the shaft bore 18c being suitably disposed in flow communication with the journal bearing gap 20a. In the exemplary embodiment illustrated in FIGS. 1 and 2, a single, center axial bore 18c extends coaxially through the proximal end of the shaft 18 radially below both the journal bearing 16a and the screw pump 26. Multiple axial bores may be used if desired and should be suitably spaced apart from each other for providing vibratory balance of the shaft 18 under rotation.

As shown in FIG. 1, the shaft 18 further includes an axial orifice 18d at its proximal end disposed in flow communication with the shaft bore 18c. The shaft 18 also includes an intermediate portion spaced axially inwardly from its proximal end having one or more radial orifices 18e disposed in flow communication with an opposite axial end of the shaft bore 18c. The journal bearing 16a and the screw pump 26 are disposed axially between the axial and radial orifices 18d,e, and the screw threads 26a are suitably pitched or angled to pump the lubricant 22 axially through the screw pump 26 itself and in turn through the journal bearing gap 20a in recirculation through the shaft bore 18c by way of the axial and radial orifices 18d,e.

As indicated above, the screw pump 26 may be incorporated with the journal bearing 20a in various embodiments. In the exemplary embodiment illustrated in FIGS. 1 and 2, the pump seat 30a is a coaxial integral portion of the housing bore 16 and extends axially away from the journal bearing 20a. And, the pump spindle 28a is a coaxial integral portion of the shaft 18 and extends axially away from the journal 18a. In this way, the screw pump 26 axially adjoins the journal bearing 16a within the common housing bore 16 and therefore requires a suitable axial length therefor. As shown in FIG. 1, the journal bearing 18a including the nonsupporting center groove 18b has a first axial length $L_1$, and the screw pump 26 has an adjoining second axial length $L_2$ which includes the axial extent of the screw threads 26a.

The screw threads 26a may include a single thread of multiple turns, or multiple threads having part or multiple turns as appropriate. The screw threads 26a may have any suitable cross section from square cornered to radiused, with a suitable helix angle for effectively pumping the lubricant 22 in an axial direction with suitable driving pressure.

As shown in FIG. 2, the radially outer tips of the screw threads 26a define a tip clearance C with the pump seat 30a which is suitably small to avoid rubbing therewith and for effectively pumping the lubricant 22 with minimal backflow of the lubricant 22 over the thread tips. In the exemplary embodiment illustrated in FIG. 2, the screw threads 26a have a radial height of about 2 mils, with the axial groove between adjacent threads 26a being about 20 to about 30 mils wide in a shaft 18 of a nominal 250 mil outer diameter. The journal bearing gap 20a is preferably substantially equal in radial height to the pump gap 20b, and the screw threads 26a extend into the pump gap 20b to define a suitably small tip clearance C for restricting backflow of the lubricant 22 axially away from the journal bearing 16a. The gaps 20a and 20b may be within the range of about 1–3 mils, for example. And, the screw threads 26a may have a helix angle of about 11 degrees and may be defined by four threads, each having a single turn, for example. Since the integrated screw pump 26 and journal bearing 16a may have various configurations, the screw pump 26 will be correspondingly sized for providing the required amount of lubricant flowrate and pressure as needed for the particular journal bearing application and choice of lubricant.

Figure 3:
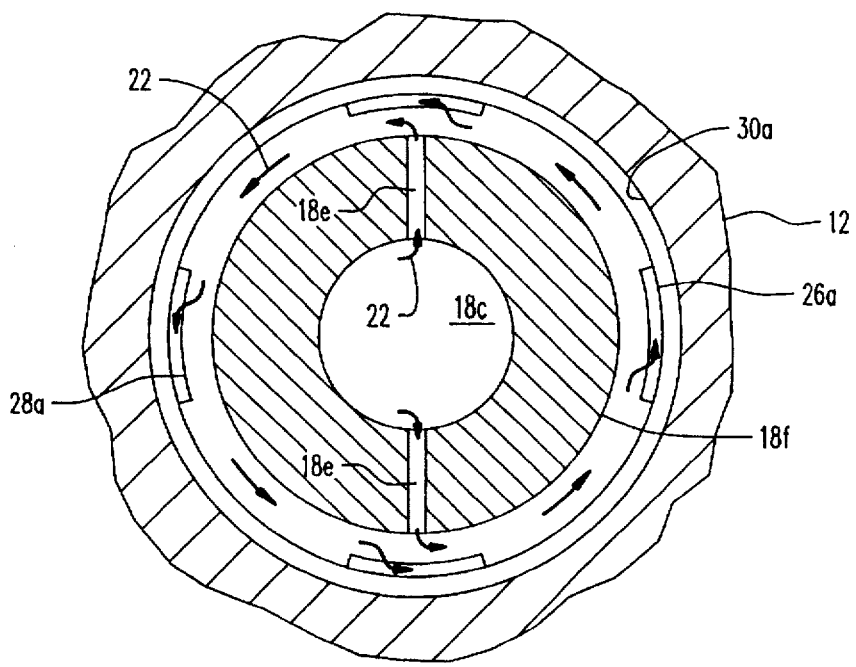
FIG. 3 is a radial sectional view through a portion of the shaft and housing illustrated in FIG. 1 and taken along line 3—3.

In the exemplary embodiment illustrated in FIGS. 1–3 wherein the screw threads 26a are disposed on the outer surface of the shaft 18, the shaft radial orifices 18e define shaft bore outlets, and the shaft axial orifice 18d defines a shaft bore inlet. The shaft 18 preferably also includes an annular inlet manifold or groove 18f on one axial side of the screw thread 26a adjacent to the shaft bore outlet 18e for receiving the lubricant 22 therefrom. The shaft 18 also includes an annular outlet manifold or groove 18g on an opposite axial side of the screw threads 26a for receiving the lubricant therefrom, and circumferentially distributing lubricant between the circumference of the journal 18a and the journal bearing 16a.

The outlet groove 18g axially separates the journal 18a from the screw pump 26 and circumferentially collects the lubricant 22 from between the individual screw threads 26a. This allows the shaft 18 to be loaded or operated in any orientation from vertical to horizontal without compromising the lubricant supply through the journal bearing 16a. It is recognized that the journal 18a is initially loosely mounted within the journal bearing 16a notwithstanding any lubricant contained in the journal bearing gap 20a. Rotation of the shaft 18 causes eccentric movement of the journal 18a in the journal bearing 16a for developing a hydrodynamic film in a conventional manner. The outlet groove 18g ensures that the pressurized lubricant from the screw pump 26 is circumferentially distributed into the journal bearing gap 20a for ensuring effective operation thereof in any orientation which is important in a portable device application which may be hand held in any orientation relative to gravity.

Similarly, the inlet groove 18f as illustrated in more particularity in FIG. 3 collects the lubricant 22 from the discrete radial orifices 18e, and uniformly circumferentially distributes the lubricant 22 into the inlet spaces defined by the adjacent screw threads 26a which communicate with the inlet groove 18f.

As shown in FIGS. 1 and 2, the journal bearing 16a and integral screw pump 26 are preferably sealed with the shaft 18 for preventing leakage of the lubricant 22 and ensuring a long useful life. Accordingly, the journal bearing assembly 10 preferably also includes a shaft seal 32 suitably joined to the housing 12 adjacent to the inlet groove 18f for sealing or preventing leakage of the lubricant 22 from the housing 12 around the shaft 18. In a preferred embodiment, the lubricant 22 is a conventional magnetic ferrofluid, and the shaft seal 32 is a ferrofluid seal having conventional components. A ferrofluid is a magnetic liquid which may be used for lubrication. The liquid may be a mineral oil having Angstrom size iron particles in suspension therein. The particles may be in the form of iron oxide coated with a relatively soft outer layer of stearic acid or other suitable material that keeps the particles in stable suspension in the oil. The unique properties of a ferrofluid include the ability to provide effective lubrication, while at the same time being sealed between a rotating shaft and a housing by a strong radial magnetic field in the gap therebetween. Ferrofluid seals in general are conventionally known and along with suitable ferrofluids, are commercially available from the Ferrofluidics Corporation of Nashua, N.H..

As shown schematically in FIG. 2, the ferrofluid seal 32 includes a pair of washer plates defining magnetic poles 32a which axially bound an annular, axially magnetized magnet 32b. The poles 32a are spaced radially outwardly from the outer surface of the shaft 18 to define a radial pole gap 32c. Portions of the ferrofluid lubricant 22 are illustrated schematically in FIG. 2 as being magnetically accumulating below each of the poles 32a to define ferrofluid O-rings 22a. The shaft 18 itself is magnetic so that the magnetic O-rings 22a provide effective seals against leakage of the lubricant 22 from the radial gaps 32c.

In the exemplary embodiment illustrated in FIG. 2 wherein the housing 12 and shaft 18 are subject to shock loads, it is desirable to specifically configure the ferrofluid seal 32 on the shaft 18 for preventing leakage therefrom during an axial shock load, for example, which transiently pressurizes the lubricant 22 towards the pole gap 32c. More specifically, in the event of a horizontal shock load in FIG. 2 wherein the shaft 18 and housing 12 are abruptly decelerated to the right, the lubricant 22 which has mass inertia will develop a transient pressure increase which may exceed the pressure capability of the ferrofluid O-rings 22a.

Accordingly, the ferrofluid seal 32 is preferably spaced axially away from the inlet groove 18f to define a radial restriction 34 between the inner surface of the housing bore 16 and the outer surface of the shaft 18. This may be accomplished by suitably mounting the seal 32 in an end counterbore 12a of the housing 12, with the left or inwardmost pole 32a being spaced axially away from the inlet groove 18f. The restriction 34 is preferably radially smaller than the pole gap 32c to provide a flow constriction. In this way, the pole gap 32c may be made as large as desired for providing an effective magnetic sealing O-ring 22a, with the restriction 34 being suitably radially smaller.

And, the restriction 34 has any suitable axial length to provide a sufficient pressure drop suitable for accommodating any contemplated shock pressure within the lubricant 22 during a transient shock loading. In operation, the transient shock movement of the lubricant 22 axially through the restriction 34 towards the seal 32 during a shock load, is resisted by the restriction 34 so that excessive transient pressure does not reach the O-rings 22a. The effectiveness of the O-rings 22a is therefore maintained even during shock, and thereby prevents leakage from the seal 32. In an exemplary embodiment, the restriction 34 may be about 1–2 mils in radial height, with the pole gap 32c being correspondingly larger in the exemplary range of 2–3 mils. The effectiveness of the restriction 34 under a 3,000-g shock load has been confirmed by test.

In the preferred embodiment, the left O-ring 22a is in direct contact with the lubricant 22 in the bore 16 and is ineffective by itself to seal leakage. Accordingly, in another feature of the invention, the region between the two O-rings 22a in the bore of the magnet 32b is suitably pressurized with a gas such as air to provide sealing effectiveness of the left O-ring 22a. As shown in FIG. 1 and 2, the screw pump 26 and journal bearing 16a are preferably configured for minimizing the pressure of the lubricant 22 at the shaft seal 32 itself to ensure effective sealing thereat. Since the screw pump 26 may be configured for developing tens of psi pressure in the lubricant 22 it is desirable not to subject the seal 32 to the maximum pressure of the screw pump 26.

Accordingly, the inlet or suction end of the screw pump 26 at the inlet groove 18f is preferably disposed adjacent to the shaft seal 32 as illustrated, with the outlet or pressure end of the screw pump 26 being axially spaced away from the seal 32 for providing maximum pressure lubricant 22 directly to the journal bearing 16a. As shown in FIG. 1, the lubricant 22 circulates axially in turn through the screw pump 26 and the journal bearing 16a, and is then axially returned through the shaft bore 18c to the inlet groove 18e for repeating the cycle. The lowest pressure lubricant 22, therefore, is located at the shaft seal 32 for reducing the pressure sealing requirements thereof.

As shown in the exemplary embodiment in FIG. 1, the journal bearing assembly 10 preferably also includes an endcap 36 suitably fixedly joined to the proximal end of the housing 12 at the shaft bore inlet 18d. The endcap 36 may be formed of any suitable material such as plastic if desired, with the shaft 18 and housing 12 being formed of a suitable metal. The endcap 36 is spaced axially from the proximal end of the shaft 18 to define a thrust bearing 38 therewith. The thrust bearing 38 is disposed in flow communication with both the journal bearing gap 20a and the shaft bore 18c for recirculating the lubricant in turn through the screw pump 26, journal bearing 16a, thrust bearing 38, and the shaft bore 18c.

Figure 4:
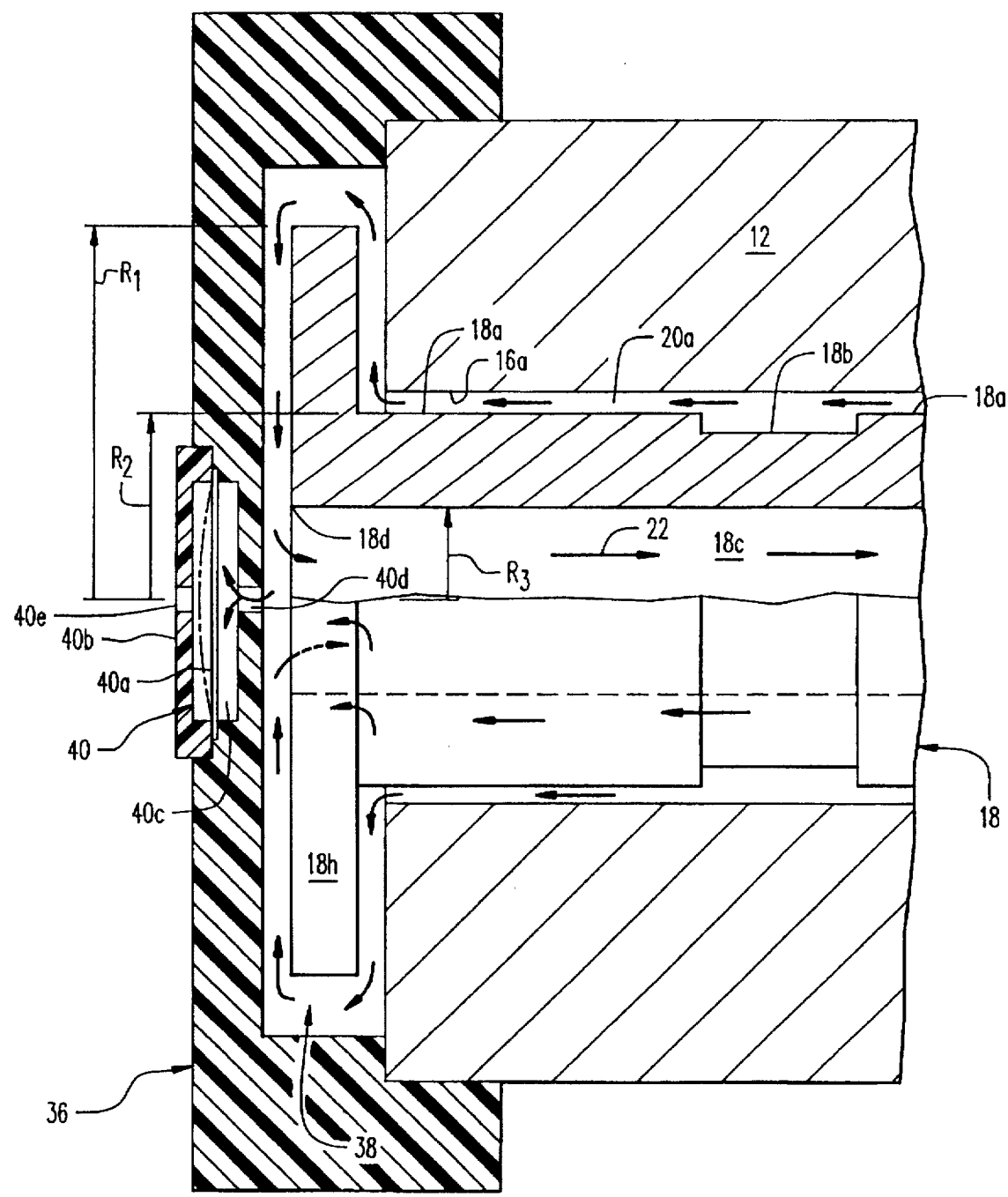
FIG. 4 is an enlarged partly sectional, axial view of a proximal end of the journal bearing assembly illustrated in FIG. 1 showing an integral double acting thrust bearing joined to the shaft adjacent to the journal bearing.

In the exemplary embodiment illustrated in FIG. 1, and enlarged in FIG. 4, the shaft 18 further includes an integral thrust bearing disk 18h extending radially outwardly from the shaft proximal end and spaced axially between the endcap 36 and the proximal end of the housing 12 for effecting a double-acting thrust bearing 38 for accommodating axial loads of the shaft 18 in either of two opposite axial directions. The disk 18h has an outer radius $R_1$ which is suitably larger than an inner radius $R_2$ at its juncture with the outer diameter of the shaft 18 at the journal 18a. And, the shaft bore 18c has a radius $R_3$ at the axial orifice 18d.

The disk 18h therefore extends radially outwardly from the shaft 18 and radially overlaps a suitable portion of the end face of the housing 22 to provide thrust bearing capability in one direction to the right as illustrated in FIG. 4. And, thrust bearing capability in the opposite direction to the left as illustrated in FIG. 4 is provided by the inner surface of the endcap 36 corresponding with the entire end face of the disk 18h surrounding the axial orifice 18d. Since the effective areas of the opposite end faces of the disk 18h are different and unequal, different thrust load capability is correspondingly provided.

In the exemplary embodiment illustrated in FIGS. 1 and 4, the screw pump 26 is effective for providing the lubricant 22 under suitable pressure for circulating the lubricant through the journal bearing gap 20a and around the thrust bearing 38 for providing hydrostatic operation thereof.

During operation, axial loads carried by the shaft 18 to the left displace the shaft 18 and disk 18h to the left in FIG. 4 which will decrease the axial clearance between the disk 18h and the endcap 36 and provide thrust bearing capability due to the pressurized lubricant 22 circulating from the journal bearing gap 20a. As the left axial gap on the disk 18h decreases, the right axial gap between the disk 18h and the housing 22 increases for decreasing pressure drop and more efficiently channeling the lubricant 22 around and over the perimeter of the disk 18h. When the axial load carried by the shaft 18 is to the right in FIG. 4, the opposite occurs with the right side axial clearance decreasing for effecting thrust bearing capability between the disk 18h and the housing 12, with the left side axial clearance on the disk 18h increasing for reduce pressure drop. This efficiently returns the lubricant 22 through the shaft bore 18c.

Since the area of the disk 18h is larger on the left than the right, the values of $R_1$, $R_2$, and $R_3$ may be suitably varied to optimize bi-directional stability.

The journal bearing assembly 10 illustrated in FIG. 1 is preferably hermetically sealed, with the endcap 36 enclosing one end of the housing 12, and the shaft seal 32 enclosing the opposite end of the housing 12 for containing the lubricant 22 therein without leakage or air bubbles. In this way, the journal bearing assembly 10 is self contained and self pressurizing using the integral screw pump 26 therein for recirculating the lubricant 22 along the various bearing surfaces thereof without leakage from the shaft seal 32. The shock capacity of the bearing assembly 10 is extremely large in both the radial and axial direction due to the correspondingly large surface area of contact bounding the lubricant 22.

In an exemplary miniature shaft design suitable for a small computer disk drive, the shaft 18 through the housing 12 has a length of about 300 mils and an outer diameter of about 100 mils. A ferrofluid lubricant 22 with 3 cp viscosity may be used, and the shaft 18 operated at about 3600 rpm. Power loss in such a bearing assembly is extremely low on the order of about 100 mw. And, the journal bearing 16a may have a radial stiffness of about 10,000 lb/in which can exceed a corresponding ball bearing suspension by a factor of about two. Axial stiffness of about 5,000 lb/in may be effective which meets or exceeds that of a corresponding ball bearing suspension. Torsional stiffness or tilting resistance capability by the axially spaced apart journals 18a may be about 1,500 in-lb/rad which is comparable to using two ball bearings spaced apart at 300 mils. Suspension dynamics of the journal bearing should be comparable to that of ball bearings or better. Less vibration is contemplated which should enhance precision of disk tracking. Radial and non-repeatable runout should also be improved over ball bearings.

Since the bearing assembly 10 is preferably hermetically sealed, it is desirable to provide means for accommodating volume changes of the lubricant 22 therein due to temperature and pressure, for example, which might lead to leakage of the shaft seal 32. FIG. 4 illustrates an exemplary embodiment of a suitable accumulator 40 disposed in flow communication with the lubricant 22 in the housing 12 for accommodating volume changes of the lubricant to reduce pressure changes therefrom. The accumulator 40 in an exemplary embodiment includes a resilient diaphragm 40a which may be a disk of Mylar or Kapton of about 1 mil in thickness suitably mounted using an annular retainer 40b in the center of the endcap 36 to define a reservoir 40c at one side thereof. A suitably small orifice 40d extends through the inner portion of the endcap 36 in flow communication between the reservoir 40c and the thrust bearing 38. The retainer 40b includes a suitable vent 40e which provides atmospheric pressure on the back side of the diaphragm 40a. The reservoir 40c is filled with the lubricant 22 in flow communication with the thrust bearing 38. During operation, heating of the lubricant 22 which causes expansion thereof will be accommodated by deflection of the diaphragm 40a without leakage. In this way, the designed-for pressure of the lubricant 22 throughout the journal bearing assembly 10 will not be exceeded to thereby prevent leakage from the shaft seal 32.

In the embodiment illustrated in FIG. 1, the screw pump 26 is disposed axially in-line with the journal 18a in a one-piece assembly, with the overall length including the individual length of these components. Since the screw pump 26 itself does not function as a journal bearing, radial and tilt stiffness of the shaft 18 must be provided solely by the journal bearing 16a. The two journals 18a illustrated are separated apart from each other as much as possible to provide tilt stiffness, with the shaft groove 18b being correspondingly maximized to eliminate portions of the journal 18a which are not necessary for providing suitable radial stiffness. The groove 18b reduces the pressure requirements of the screw pump 26 which simplifies the design thereof.

However, in relatively thin disk drives, for example, the thickness of the drive is a major constraint such as integrating a disk drive into a relatively thin PCMCIA card or similar application. The overall length of the bearing assembly 10 illustrated in FIG. 1 may be too large in such a situation, and therefore it is desirable to reduce the overall axial length of the bearing assembly while still providing adequate tilt stiffness and self pressurizing capability.

Figure 5:
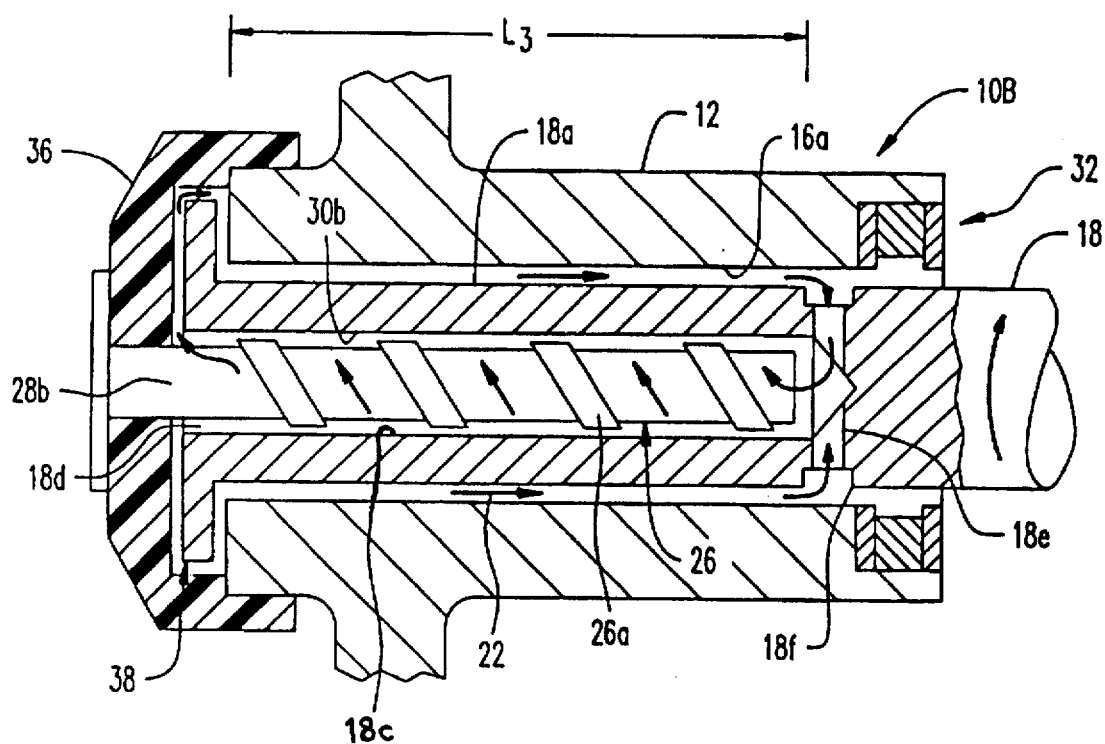
FIG. 5 is a partly sectional, axial view of a journal bearing assembly in accordance with another embodiment of the present invention wherein the screw pump is disposed inside the rotary shaft.

FIG. 5 illustrates an alternate embodiment of the journal bearing assembly designated 10B which may be made substantially shorter than the assembly 10 illustrated in FIG. 1 while meeting or exceeding the tilt stiffness thereof. In FIG. 5, the pump spindle, designated 28b, is suitably fixedly attached to the housing 12 through the center of the endcap 36 for example. The pump spindle 28b extends concentrically and axially inside the shaft bore 18c in the form of a cantilever supported by the endcap 36 at its proximal end, and freely supported at its distal end inside the shaft 18.

The pump casing or seat 30b in this embodiment is defined by the inner surface of the shaft bore 18c itself. In this embodiment, the shaft journal 18a is continuous for substantially its entire length inside the housing 12 to cooperate with the corresponding journal bearing 16a over an axial third length $L_3$.

Accordingly, the screw pump 26 defined between the spindle 28b and the shaft bore 18c is axially coextensive and substantially overlaps the axial extent of the journal bearing 16a for the entire third length $L_3$. The screw pump 26 is therefore disposed radially inwardly of or below the journal bearing 16a in a compact and collectively short integrated assembly. In this way, the overall length $L_3$ of the screw pump and journal bearing may be made substantially smaller than the combined first and second lengths $L_1$ and $L_2$ of the axial in-line screw pump and journal bearing illustrated in the FIG. 1 embodiment. For example, the third length $L_3$ of the journal bearing 16a illustrated in FIG. 5 may be equal to the first length $L_1$ of the combined journal bearing 16a in FIG. 1 for obtaining substantially equal tilt and radial stiffness capability in an overall shorter length.

More specifically, the second length $L_2$ for the screw pump illustrated in FIG. 1 is no longer required in the FIG. 5 embodiment wherein the screw pump is instead located fully within the journal bearing 16a and within its overall axial extent. At a given tilt stiffness requirement, therefore, the FIG. 5 embodiment may be substantially shorter than the FIG. 1 embodiment and may be used to advantage in thin-envelopes such as that found in the conventional PCMCIA card for integrating a precision disk drive therein. And, the short bearing assembly 10B also enjoys the radial and axial precision of the embodiment illustrated in FIG. 1 along with the corresponding radial and axial bearing stiffnesses associated therewith. The assembly 10B illustrated in FIG. 5 also enjoys the improved shock capability described above with respect to the FIG. 1 embodiment.

Since it is not desirable to discharge the high pressure lubricant from the screw pump 26 adjacent to the ferrofluid seal 32 illustrated in FIG. 5, it is preferred that the shaft radial orifices 18e define a shaft bore inlet disposed in flow communication with one end of the journal bearing 16a, and the shaft axial orifice 18d defines a shaft bore outlet disposed in flow communication with an opposite end of the journal bearing 16a for recirculating the lubricant 22 in a direction opposite to that illustrated in the FIG. 1 embodiment. In FIG. 5, the screw threads 26a are angled to pump the lubricant 22 axially between the shaft bore inlet 18e and outlet 18d and in turn axially across the journal bearing 16a in a recirculation loop. The shaft bore inlet 18e defines the suction inlet to the screw pump 26, and therefore the inlet groove 18f defines a relatively low pressure region adjacent to the ferrofluid shaft seal 32 which does not adversely pressurize the seal 32 or degrade its performance.

The screw threads 26a illustrated in FIG. 5 may be disposed on the spindle 28b as shown, or could instead be disposed on the inner surface of the shaft bore 18c (not shown). The rotation of the shaft 18 therefore self powers the screw pump 26 due to the relative movement between the stationary spindle 28b and the rotating pump seat 30b. The bearing assembly 10B illustrated in FIG. 5 may otherwise include the identical features illustrated in FIG. 1 including the ferrofluid shaft seal 32, with the lubricant 22 being ferrofluid, and the integrated double acting thrust bearing 38. The shaft 18 retains the inlet groove 18f in flow communication with the shaft bore inlet 18e. The shaft seal 32 is joined to the housing 12 adjacent to the inlet groove 18f with a corresponding restriction 34 like that illustrated in FIG. 2 for sealing leakage of the lubricant around the shaft 18 during normal operation and during shock loads as described above.

During operation, the shaft 18 rotates freely around the spindle 28b to develop the hydrodynamic film along the journal bearing 16a for rotatably supporting the shaft 18 with suitable radial stiffness and tilt stiffness. The lubricant 22 is pumped axially along the screw pump 26 for providing recirculation in turn through the screw pump 26, thrust bearing 38, and journal bearing 16a, with the lubricant 22 returning to the screw pump 26 by flowing radially inwardly through the inlet holes 18e. Since the lubricant 22 is allowed to freely flow uniformly circumferentially around the thrust bearing 28 to enter the journal bearing 16a, the bearing assembly 10B is also operable in any angular orientation of imposed load.

By locating the screw pump 26 inside the shaft bore 18c, the journal bearing 16a may utilize the complete available axial length of the shaft journal 18a for maximizing tilt stability. And, the length of the screw pump 26 may be made longer to deliver higher pressure. Also, the screw threads 26a may have a tighter clearance with the seat 30b for minimizing backflow leakage in the pump itself. The performance of the journal bearing 16a and the screw pump 26 may now be independently optimized without adversely affecting each other. There is no contact between the spindle 28b and the shaft bore 18c since the journal bearing 16c centers the shaft 18 and support the external loads carried thereby.

Whereas the thrust bearing 38 is operated hydrostatically and can be bi-directionally very stiff axially using small axial clearances in FIG. 4, the thrust bearing 38 illustrated in FIG. 5 is specifically configured in this embodiment for unidirectional loading. The axial clearances are conveniently set by the corresponding dimensions of the endcap 36 relative to the housing 12. The screw pump 26 pressurizes the ferrofluid lubricant 22 through both the thrust bearing 38 and the journal bearing 16a for ensuring full film operation with lubricant pressures on the order of tens of psi being readily achievable. Since the suction side of the screw pump 26 is defined at the inlet groove 18f, the ferrofluid shaft seal 32 is not subjected to excessive internal pressure.

Various embodiments of a self pressuring journal bearing have been disclosed above which may be configured with or without integrated thrust bearings or shaft seals. They may be sized as small or as large as desired, with the small sizes thereof being useful in space limiting portable devices such as computer disk drives. Suitable radial, axial, and tilt stiffness may be provided for precisely positioning the shaft while accommodating reaction loads during normal operation and during transient shock without damage to the assembly or leakage of the lubricant therefrom. In another embodiment not illustrated, the journal and screw pump may be formed over the outer surface of a tubular piston for use in a linear fluid pump which magnetically rotates the piston within a housing for powering the screw pump.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A journal bearing assembly comprising:
   a tubular housing having a bore defining a plain cylindrical journal bearing;
   a cylindrical rotary shaft disposed coaxially in said journal bearing, and having a plain cylindrical journal spaced radially inwardly of said journal bearing to define a journal bearing gap having first and second axially opposite ends; and
   a screw pump defined in part by a portion of said shaft, and disposed inside said housing bore in flow communication with said journal bearing gap first end for continuously circulating a lubricant thereto under pressure upon rotation of said shaft for accommodating lubricant end leakage from said journal bearing gap second end.

2. A bearing assembly according to claim 1 wherein said screw pump comprises:
   a spindle disposed coaxially with said shaft;
   a tubular seat disposed concentrically around said spindle and spaced radially outwardly therefrom to define a pump gap; and
   a plurality of helical screw threads disposed on one of said spindle and said seat in said pump gap so that relative rotation between said pump spindle and seat upon rotation of said shaft self-pumps said lubricant along said screw threads to feed said journal bearing gap with said lubricant under pressure.

3. A bearing assembly according to claim 2 wherein said shaft includes an axial bore for channeling said lubricant, and said shaft bore is disposed in flow communication with said journal bearing gap.

4. A bearing assembly according to claim 3 wherein:
   said shaft further includes a proximal end having an axial orifice disposed in flow communication with said shaft bore, and an intermediate portion having a radial orifice disposed in flow communication with an opposite axial end of said shaft bore;
   said journal bearing and said screw pump are disposed axially between said axial and radial orifices; and
   said screw threads are angled to pump said lubricant axially through said screw pump and in turn through said journal bearing gap in recirculation through said shaft bore by said axial and radial orifices.

5. A bearing assembly according to claim 4 wherein:
   said pump seat is a portion of said housing bore extending axially away from said journal bearing; and
   said pump spindle is a portion of said shaft extending axially away from said journal.

6. A bearing assembly according to claim 5 wherein:
   said screw threads are disposed on said shaft;
   said shaft radial orifice defines a shaft bore outlet;
   said shaft axial orifice defines a shaft bore inlet; and
   said shaft includes an annular inlet groove on one side of said screw threads adjacent to said shaft bore outlet for receiving said lubricant therefrom, and an annular outlet groove on an opposite side of said screw threads for receiving said lubricant therefrom, and distributing said lubricant to said journal bearing.

7. A bearing assembly according to claim 6 wherein said bearing gap and said pump gap are substantially equal in radial height, and said screw threads extend into said pump gap for restricting backflow of said lubricant axially away from said journal bearing.

8. A bearing assembly according to claim 6 further comprising a shaft seal joined to said housing adjacent to said inlet groove for sealing leakage of said lubricant around said shaft.

9. A bearing assembly according to claim 8 wherein said lubricant is a ferrofluid, and said shaft seal is a ferrofluid seal.

10. A bearing assembly according to claim 9 wherein:
    said ferrofluid seal includes a pair of magnetic poles axially bounding an annular magnet, with said poles being spaced radially outwardly from said shaft to define a radial pole gap;

said ferrofluid seal is spaced axially from said inlet groove to define a radial restriction between said housing bore and said shaft; and said restriction is radially smaller than said pole gap.

11. A bearing assembly according to claim 8 further comprising an endcap fixedly joined to said housing at said shaft bore inlet and spaced axially from said shaft to define a thrust bearing therewith, with said thrust bearing being disposed in flow communication with both said journal bearing gap and said shaft bore for recirculating said lubricant in turn through said screw pump, journal bearing, thrust bearing, and shaft bore.

12. A bearing assembly according to claim 11 wherein said shaft further includes a thrust bearing disk extending radially outwardly from said shaft proximal end and spaced axially between said endcap and said housing for effecting a double acting thrust bearing.

13. A bearing assembly according to claim 12 further comprising an accumulator disposed in flow communication with said lubricant in said housing for accommodating volume changes thereof to reduce pressure changes therefrom.

14. A bearing assembly according to claim 13 wherein said accumulator comprises:

a resilient diaphragm mounted in said endcap to define a reservoir; and an orifice extending through said endcap in flow communication between said reservoir and said thrust bearing.

15. A bearing assembly according to claim 3 wherein:

said pump spindle is attached to said housing and extends concentrically inside said shaft bore; and said pump seat is defined by said shaft bore.

16. A bearing assembly according to claim 15 wherein said screw pump and journal bearing are axially coextensive, with said screw pump being disposed radially below said journal bearing.

17. A bearing assembly according to claim 16 wherein:

said shaft radial orifice defines a shaft bore inlet disposed in flow communication with one end of said journal bearing;

said shaft axial orifice defines a shaft bore outlet disposed in flow communication with an opposite end of said journal bearing; and said screw threads are angled to pump said lubricant axially between said shaft bore inlet and outlet and in turn axially across said journal bearing in recirculation.

18. A bearing assembly according to claim 16 wherein:

said screw threads are disposed on said spindle;

said shaft includes an annular inlet groove in flow communication with said shaft bore inlet; and further comprising a shaft seal joined to said housing adjacent to said inlet groove for sealing leakage of said lubricant around said shaft.

19. A bearing assembly according to claim 18 wherein said lubricant is a ferrofluid, and said shaft seal is a ferrofluid seal.

20. A bearing assembly according to claim 19 wherein:

said ferrofluid seal includes a pair of magnetic poles axially bounding an annular magnet, with said poles being spaced radially outwardly from said shaft to define a radial pole gap;

said ferrofluid seal is spaced axially from said inlet groove to define a radial restriction between said housing bore and said shaft; and said restriction is radially smaller than said pole gap; and further comprising an endcap fixedly joined to said housing at said shaft bore inlet and spaced axially from said shaft to define a thrust bearing therewith, with said thrust bearing being disposed in flow communication with both said journal bearing gap and said shaft bore for recirculating said lubricant in turn through said screw pump, thrust bearing, and journal bearing.

* * * * *